US006197428B1

(12) United States Patent
Rogers

(10) Patent No.: US 6,197,428 B1
(45) Date of Patent: Mar. 6, 2001

(54) GEMSTONES AND DECORATIVE OBJECTS COMPRISING A SUBSTRATE AND AN OPTICAL INTERFERENCE FILM

(75) Inventor: Donald Z. Rogers, Santa Rosa, CA (US)

(73) Assignee: Deposition Sciences, Inc., Santa Rosa, CA (US)

( * ) Notice: Subject to any disclaimer, the term of this patent is extended or adjusted under 35 U.S.C. 154(b) by 0 days.

(21) Appl. No.: 08/296,779

(22) Filed: Aug. 26, 1994

(51) Int. Cl.[7] .......... B32B 9/04

(52) U.S. Cl. .......... 428/446; 63/32; 428/542.2; 428/688; 428/689

(58) Field of Search .......... 501/86; 63/32; 428/688, 689, 542.2, 411.1, 446

(56) References Cited

U.S. PATENT DOCUMENTS

| | | | |
|---|---|---|---|
| 3,539,379 * | 11/1970 | Mayer | 117/69 |
| 4,599,251 | 7/1986 | Feller | 428/156 |
| 4,793,864 | 12/1988 | Neumiller et al. | 134/1 |
| 5,054,902 * | 10/1991 | King | 351/44 |

FOREIGN PATENT DOCUMENTS

| | | |
|---|---|---|
| 265718 | 10/1968 | (AT) . |
| 346666 | 7/1960 | (CH) . |
| 410498 | 10/1966 | (CH) . |
| 24 44 705 A1 | 4/1976 | (DE) . |
| 37 08 171 A1 | 9/1988 | (DE) . |

OTHER PUBLICATIONS

Optics, pp. 376–377 © 1987 Addison–Wesley.*

* cited by examiner

*Primary Examiner*—D. S. Nakarani
(74) *Attorney, Agent, or Firm*—Carter, Ledyard & Milburn

(57) ABSTRACT

An article useful as a gemstone or decorative object. A formed substrate is used as a base for an optical interference coating applied on the exterior of the substrate. The optical interference coating is made of alternating layers of materials with relatively high refractive indices and relatively low refractive indices, the refractive indices and thicknesses of the alternating layers being chosen so that at least part of the light of wavelengths between 400 nanometers and 700 nanometers incident on the article is reflected. The optical coating creates an interference filter formed of alternating layers of a material with a low refractive index and a material with a high refractive index. The article provides a visual appearance that is novel and different from other gemstones or decorative objects, either man-made or natural.

12 Claims, 4 Drawing Sheets

GEMSTONES AND DECORATIVE OBJECTS COMPRISING A SUBSTRATE AND AN OPTICAL INTERFERENCE FILM

TECHNICAL FIELD OF THE INVENTION

The present invention involves decorative articles in the form of gemstones and decorative objects in the form of a substrate and optical interference coatings so that at least part of the light of wavelengths between 400 nanometers and 700 nanometers incident on the article is reflected.

BACKGROUND OF THE INVENTION

The art of producing gemstones for use in jewelry and other decorative objects by cutting and polishing naturally occurring mineral deposits is an ancient one. Existing gemstones that are colored achieve the color by absorbing some of the incident visual light. The absorption is often due to impurities in an otherwise transparent material such as aluminum oxide. Other natural gemstones, such as diamonds, are intrinsically colorless, but achieve high sparkle and flashes of color by the refraction induced by the high refractive index of the material. All intrinsically colored existing gemstones achieve their perceived color by preferential absorption of some of the wavelengths of light in the range of 400 nanometers to 700 nanometers. By the term intrinsically colored is meant colors that are invariant with respect to viewing angle, and are not the result of refraction of the incident light.

In modern times various synthetic and enhanced gemstones have been manufactured by a variety of processes. Some of these processes are intended to produce copies of naturally occurring gemstones, or to enhance the color of otherwise less valuable gemstones. For example, exposure of some transparent, colorless minerals to various types of high energy radiation can cause the mineral to become absorbing and therefore colored. Alternately, various processes have been described to improve the durability of gemstones by applying an overcoat of a more durable material. For example, Mayer (U.S. Pat. No. 3,539,379) describes the deposition of a single layer of aluminum oxide to the exterior of a gemstone to improve hardness and scratch resistance, but with the specific additional intent of not changing the perceived color of the native gemstone. German patent DE 3708171 A1 and a German patent application describe the deposition of diamond like coating to improve the hardness of gemstones. Feller (U.S. Pat. No. 4,599,251) discloses a decorative object manufactured by forming a single layer of a metal oxide on a silicon surface. Neumiller (U.S. Pat. No. 4,793,864) discloses formation of an organic film on the surface of a gemstone for the purpose of protecting the gemstone against ultraviolet and infrared radiation, and for the purpose of cleaning the surface of the gemstone. The modification of a gemstone by deposition of one or more layers on the upper surfaces only is described in Austrian Patent 265718 (1968), Swiss Patent 410,498 (1961), and Swiss Patent 346,666 (1956).

Whether natural or synthetic, all prior art gemstones that are perceived as colored by the eye achieve the color by absorption of some of the incident light, (except for intrinsically colorless gems, such as diamonds, whose perceived colors are due to refraction at the surface of the stone). When light strikes the surface of such a colored gemstone, some portion of the incident light is reflected, and the remainder of the light is transmitted into the interior of the gemstone. Because all wavelengths of the incident light are reflected in substantially equal amounts, the reflected light has no perceived color other than that of the original incident light. Some wavelengths of the incident light that is transmitted into the interior of the gemstone are absorbed by the material of the gemstone. Those wavelengths of light not absorbed by the gemstone eventually pass out of the gemstone. Because the light that has passed through the gemstone is now deficient in certain wavelengths of light (compared to the light incident on the gemstone) the gemstone appears to the observer to have a color, said color being that produced by the complement of the wavelengths of light absorbed by the gemstone.

It is a further property of all prior art colored gemstones that the perceived color is invariant with the angle of incidence of light or of the position of the observer with respect to the gemstone with the exception of refraction affects as described above. Thus all prior art colored gemstones are monochromatic in that the light reflected from the surface of the gemstone is not colored, and the perceived color of the light transmitted through the gemstone is invariant with the angle of incidence of the light or the position of the observer.

It is a further property of all prior art colored gemstones that the perceived brilliance of the gemstone is less than that of a colorless gemstone such as a diamond. This lesser brilliance is an unavoidable result of the fact that the color of the gemstone is produced by absorption of a large fraction of the total incident visible light. Thus less total visible light is returned to the eye from a colored gemstone than from a colorless gemstone of the same size and cut. The lesser amount of total visible light leads to the colored gemstone as being perceived as of lower brilliance, or duller, than the corresponding colorless gemstone.

It would be of great advantage to provide colored gemstones with a perceived brilliance as high as that of a colorless gemstone. It would be of further advantage to have such a colored gemstone be polychromatic, and for the perceived color to be dependent on the angle of incidence of the illumination source.

It is a natural property of existing colored gemstones that the depth of color of a small stone is less than the depth of color of a larger stone of the same material and cut. This is a consequence of the fact that the path length of the light in the small stone is less than in the large stone, and by Beer's Law the amount of light absorbed in the smaller stone is less. Because for reasons of economy it is often desired to use very small gemstones in jewelry, the lesser depth of color of such small stones is a disadvantage. It would be of great advantage to provide colored gemstones in which small samples had the same depth of color as larger samples.

An object of the present invention is providing colored gemstones and decorative objects whose perceived color is polychromatic, and whose perceived brilliance is greater than that of prior art colored gemstones.

Another object of the present invention is providing colored gemstones and decorative objects whose perceived color is dependent on the angle of illumination and the position of the observer with respect to the gemstone or object.

Yet another object of the present invention is providing colored gemstones in which small stones have the same perceived depth of color as larger stones made of the same material.

Yet another object of the present invention is providing decorative objects of novel and beautiful appearance.

Additional objects and features of the invention will be made evident by the following description in which the preferred embodiments are set forth in detail in conjunction with the accompanying drawings.

SUMMARY OF THE INVENTION

In accordance with this invention, an object, previously formed to the desired final shape, hereinafter referred to as a substrate, is supplied with a thin film coating over substantially the entire surface of the substrate. This thin film coating consists of alternating layers of materials with relatively high refractive index and relatively low refractive index, the thickness of the layers being chosen so that the coating as a whole forms an interference filter such that the coating reflects a substantial portion of incident light of wavelengths between 400 nanometers and 700 nanometers (hereinafter referred to as visible light), inclusive. In the preferred implementation of the invention, the materials used in the thin film coating and the thicknesses of the alternating layers are chosen so that some wavelengths of incident visible light are more strongly reflected than are other wavelengths of incident visible light.

Additional objects and features of the invention will be made evident by the following description in which the preferred embodiments are set forth in detail in conjunction with the accompanying drawings.

DESCRIPTION OF THE PREFERRED EMBODIMENTS

Figure 1:
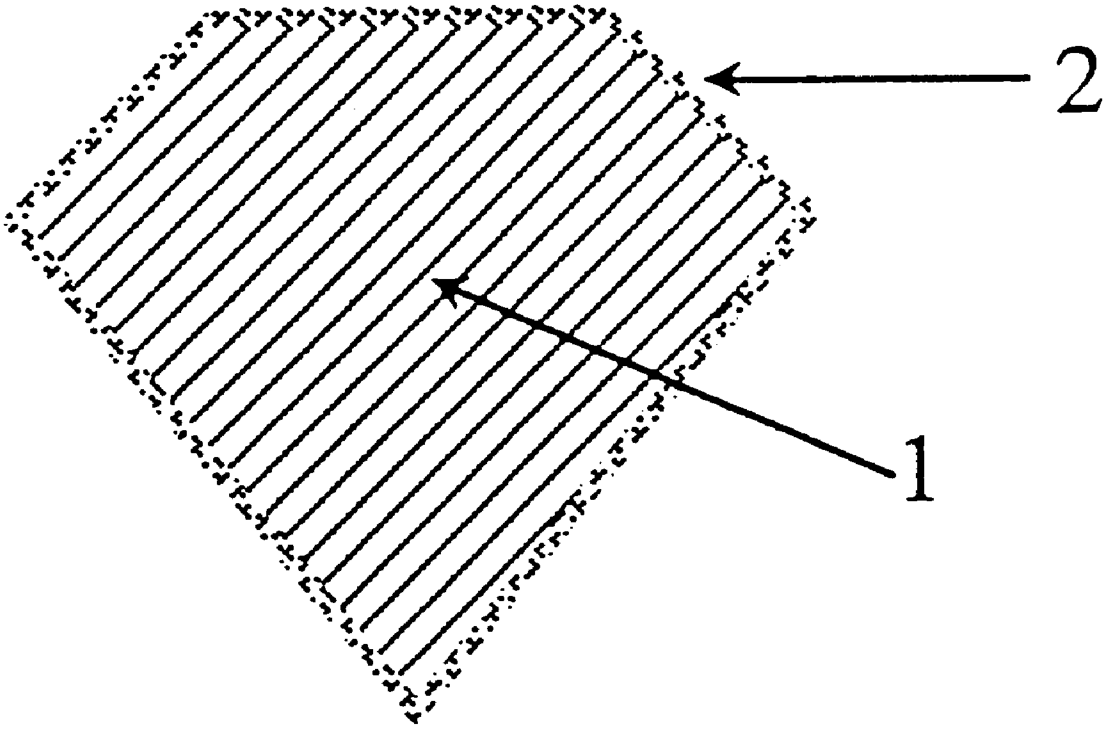
FIG. 1 is a cross-sectional representation of a faceted substrate bearing an optical interference film on its external surface, where 1 is the substrate material and 2 is the optical interference coating.

The present invention will be described in detail with reference to the accompanying drawings and examples. FIG. 1 shows a synthetic gemstone according to the present invention. The gemstone consists of a substrate 1 on which facets have been previously cut and polished, and an applied optical interference coating 2 over substantially the entire surface of substrate 1.

Figure 2:
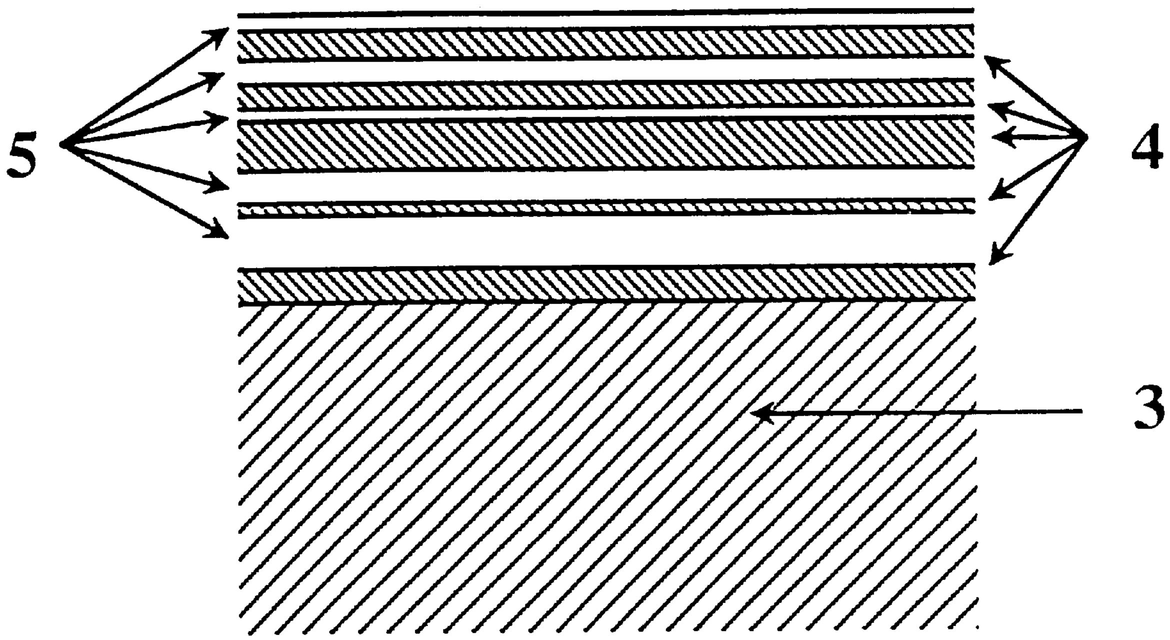
FIG. 2 is a cross-sectional view of a small section of the substrate surface together with the multi-layer optical interference film, where 3 is the substrate material, 4 is one component in the interference film, and 5 is the other component of the interference film.

FIG. 2 shows a cross sectional detail of the surface of the synthetic gemstone of FIG. 1, showing the surface of the substrate 1 and the applied multilayer coating 2. The coating consists of alternating layers of a material of low refractive index 3, and a material of a high refractive index 4. The total number of layers in the coating 2 and the thicknesses of the individual layers are selected to provide the visual appearance desired for the gemstone.

The design and use of multilayer optical interference films to selectively reflect certain wavelengths of light are well known in the art; modern practices in design, use, and manufacture of such thin film optical filters are described, for example, in H. A. Macleod, *Thin Film Optical Filters* (Macmillan, New York, 1986). Using such practices, one of ordinary skill in the art can design and deposit on a surface multilayer thin film coatings that reflects some desired set of wavelengths of the incident visible light, and transmits the remaining wavelengths of the incident visible light. Although the design and performance of such multilayer films can in principle be calculated by hand, in practice specialized computer programs are used to determine the thicknesses of the layers in the coating and to predict the optical behavior of the optical coatings.

While it is desirable in the practice of the current invention that the optical coating be substantially uniform over the entire surface of the substrate, the optical coating can vary somewhat over the surface of the substrate without departing from the intent of the present invention, provided that the coating does not vary so much that some portions of the coating fail to reflect a portion of the incident visible light.

In the preferred embodiment of the invention the substrate and the optical thin film coating are composed of materials that are substantially transmissive to light (substantially free of absorption) over the wavelength range of 400 nanometers to 700 nanometers inclusive. However, substrates and coating materials that are moderately absorptive over this wavelength range may be used without departing from the intention of the present invention.

For example, the substrate may be composed of one or more materials chosen from the group consisting of: silicon dioxide, aluminum oxide, zirconium oxide, titanium oxide, hafnium oxide, germanium oxide, zinc oxide, scandium oxide, yttrium oxide, calcium oxide, magnesium oxide, barium oxide, beryllium oxide, boron oxide, phosphorus oxide, lead oxide, arsenic oxide, sodium oxide, potassium oxide and carbon, provided that the mixture as a whole is substantially non-absorbing in the range of 400 nanometers to 700 nanometers inclusive. Alternately, the substrate may be composed of various plastics (polymers based on carbon) provided that the plastic used is substantially non-absorbing in the range of 400 nanometers to 700 nanometers inclusive.

It will be evident to one of ordinary skill in the art that other types of materials not specified in the above description may also be suitable for practicing the present invention, provided that such materials are capable of being formed into a desired shape and are substantially non-absorbing in the range of 400 nanometers to 700 nanometers inclusive; substrates formed from such materials are intended to be within the scope of the present invention.

In the preferred embodiment of the invention the substrate should be formed of material with a relatively high refractive index, as this leads to a particularly pleasing visual appearance of the coated object. Particularly suitable substrate materials are therefore such materials composed substantially of one or more members from the group consisting of: zirconium dioxide, titanium dioxide, silicon dioxide with a large percentage of lead oxide admixed, and carbon.

In the preferred embodiment of the invention the optical coating is deposited by a chemical vapor deposition process, and in particular by a low pressure chemical vapor deposition process (LPCVD). An LPCVD process is particularly suitable for practicing the present invention because it uniformly deposits an optical coating on all surfaces of even a complex shaped object. See SPIE Vol. 1168, pp 19–24 (1989).

Many other methods are known for the deposition of thin film optical coatings. See Thin Film Processes, J. L. Vossen and W. Kerns, Eds. (Academic Press, New York, 1978). For example, physical vapor deposition methods such as sputtering and electron beam evaporation, and plasma assisted methods such as plasma chemical vapor deposition, can be used to practice the present invention. In some cases it might be necessary with such coating methods to coat one set of surfaces of the substrate in one procedure, then rotate the substrate in a tooling fixture in order to allow deposition of the desired coating on the remaining surface(s) of the substrate. Any method which can be used to deposit a durable, well defined optical coating may be used to practice the current invention, provided that the method is capable of applying the thin film optical coating over at least 90% of the total surface of the substrate.

The present invention may be further understood by reference to the following examples.

EXAMPLE 1

A substrate composed of cubic zirconium dioxide and formed with cut and polished facets as in FIG. 1 was placed in a chamber and the chamber sealed. The atmosphere was exhausted from the chamber by means of a vacuum pump, and the chamber and substrate heated by external heaters to a temperature of about 500° C. Organometallic precursors capable of decomposing at 500° C. to give thin films of silicon dioxide and tantalum pentoxide are alternately admitted to the chamber, each precursor being admitted in turn for a length of time sufficient to deposit the coating described by the following graphic representation of the coating: Substrate $(HL)^4$ H ½L, where each H corresponds to a layer composed of tantalum pentoxide with a nominal thickness of 471 Ångstroms, and L corresponds to a layer composed of silicon dioxide with a nominal thickness of 715 Ångstroms.

Figure 3:
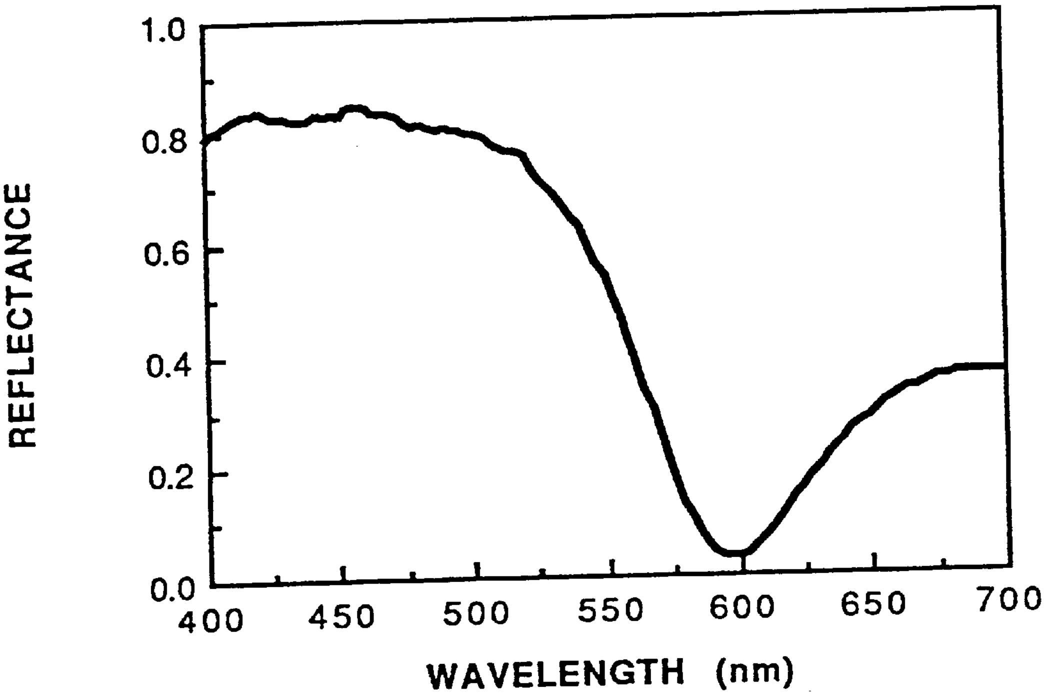
FIG. 3 is a graphic representation of the reflection spectrum in the visual range of an example interference coating of the type used in the present invention, and further described in EXAMPLE 1.

When the deposition of the optical coating was complete, the chamber was cooled, air admitted, and the coated substrate removed. Visual examination showed that the coated substrate had a visual color of golden orange in transmission and blue in reflection. The perceived color was dependent on the angle of incidence of the illumination and the relative positions of the object and the viewer. A reflectance scan of a flat glass which was coated using the same procedure is shown in FIG. 3.

EXAMPLE 2

A substrate composed of lead crystal glass and formed in the shape of a turtle was placed in a chamber and the chamber sealed. The atmosphere was exhausted from the chamber by means of a vacuum pump, and the chamber and substrate heated by external heaters to a temperature of about 500° C. Organometallic precursors capable of decomposing at 500° C. to give thin films of silicon dioxide and tantalum pentoxide are alternately admitted to the chamber, each precursor being admitted in turn for a length of time sufficient to deposit the coating described by the following graphic representation of the coating: Substrate $(HL)^4$ H ½L $(1.7H\ 1.7L)^4$ 1.7H 0.8L, where each H corresponds to a layer composed of tantalum pentoxide with a nominal thickness of 471 Ångstroms, and L corresponds to a layer composed of silicon dioxide with a nominal thickness of 632 Ångstroms. These layer thicknesses were chosen so as to provide a coating that would reflect the blue and red portions of the visible spectrum and transmit the green portion of the visible spectrum.

Figure 4:
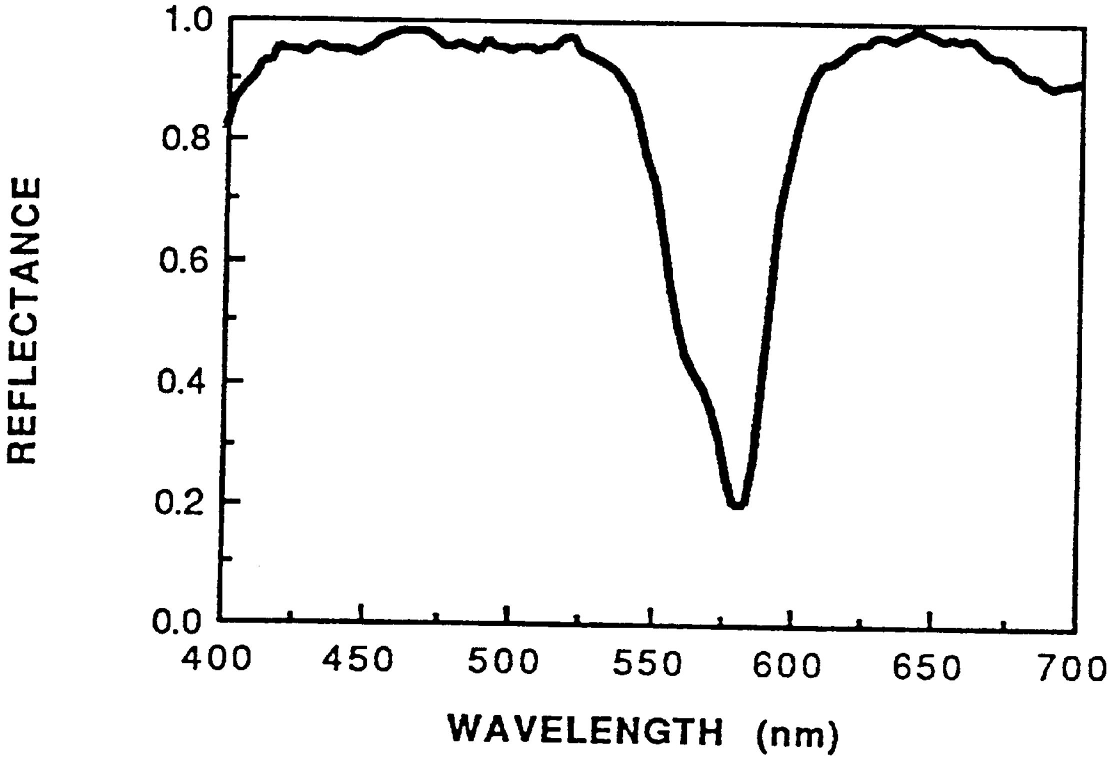
FIG. 4 is a graphic representation of the reflection spectrum in the visual range of an example interference coating of the type used in the present invention, and further described in EXAMPLE 2.

When the deposition of the optical coating was complete, the chamber was cooled, air admitted, and the coated substrate removed. Visual examination showed that the object produced had a visual color of green in transmission and silvery pink in reflection. The perceived color was dependent on the angle of incidence of the illumination and the relative positions of the object and the viewer. A reflectance scan of a flat glass which was coated using the same procedure is shown in FIG. 4.

It is apparent from the foregoing discussion and examples that the present invention has provided a novel article of manufacture that is of great utility as a synthetic gemstone or decorative object.

What is claimed is:

1. An article of manufacture comprising a substantially transparent substrate of a size and shape suitable for use as a decorative object gemstones and ornaments and a multilayer thin film interference coating over substantially the entire surface of said substrate, said coating consisting of alternating layers of substantially nonabsorbing materials with a relatively high refractive index and a relatively low refractive index with respect to each other, the thicknesses and identities of said layers being chosen so that the entire coating will preferentially reflect at least some of the incident light with wavelengths between 400 nanometers and 700 nanometers inclusive.

2. The article in claim 1 in which the substrate is a member selected from the group consisting of silicon dioxide, aluminum oxide, zirconium oxide, titanium oxide, hafnium oxide, germanium oxide, zinc oxide, scandium oxide, yttrium oxide, calcium oxide, magnesium oxide, barium oxide, beryllium oxide, boron oxide, phosphorus oxide, lead oxide, arsenic oxide, sodium oxide, potassium oxide and carbon.

3. The article in claim 1 in which the substrate is comprised of a polymeric material.

4. The article of claim 1 in which the alternating layers comprising the multilayer thin film interference coating are composed of metal oxides.

5. The article of claim 1 in which the alternating layers comprising the multilayer thin film interference coating comprise materials selected from the group consisting of silicon dioxide, aluminum oxide, tantalum oxide, niobium oxide, titanium dioxide, hafnium dioxide, zirconium dioxide, magnesium fluoride, calcium fluoride, zinc sulfide, zinc selenide and carbon.

6. The article of claim 1 in which the number of layers comprising the multilayer thin film interference coating is three or greater.

7. The article of claim 1 in which the alternating layers comprising the multilayer thin film interference coating are sequentially deposited by a chemical vapor deposition process.

8. The article claim 1 in which the alternating layers comprising the multilayer thin film interference coating are sequentially deposited by a low pressure chemical vapor deposition process.

9. The article of claim 1 in which the alternating layers comprising the multilayer thin film interference coating are sequentially deposited by plasma assisted process.

10. The article of claim 1 in which the alternating layers comprising the multilayer thin film interference coating are sequentially deposited by a sputtering process.

11. The article of claim 1 in which the alternating layers comprising the multilayer thin film interference coating are sequentially deposited by an evaporative coating process.

12. The article of claim 1 in which the alternating layers comprising the multilayer thin film interference coating are sequentially deposited by spraying onto the surface of the substrate liquid solution containing materials capable of being decomposed to form the desired layers.

* * * * *